March 28, 1933. J. KEENAN Re. 18,781

HAIR TRIMMER AND DRESSER

Original Filed Nov. 15, 1928 2 Sheets-Sheet 1

Inventor
John Keenan
by Edward Fay Wilson
Attorney

March 28, 1933. J. KEENAN Re. 18,781

HAIR TRIMMER AND DRESSER

Original Filed Nov. 15, 1928 2 Sheets-Sheet 2

Inventor
John Keenan
by Edward Fay Wilson
Attorney

Reissued Mar. 28, 1933

Re. 18,781

UNITED STATES PATENT OFFICE

JOHN KEENAN, OF CINCINNATI, OHIO

HAIR TRIMMER AND DRESSER

Original No. 1,789,234, dated January 13, 1931, Serial No. 319,672, filed November 15, 1928. Renewed July 3, 1930. Application for reissue filed September 9, 1931. Serial No. 561,969.

This invention relates to improvements in hair cutting devices and has special reference to devices having straight handles and means for adjustably clamping a thin razor blade on the handle near its end for use in shaving, cutting hair, etc.

The object of the invention is to provide a device of the kind mentioned, which shall be very simple in construction, which shall be especially adapted for cutting the hair generally and particularly around the ears; which shall have simple means of adjusting the blade for longer or shorter hair cutting; and which shall be adapted to make use of the thin double edged blades now in common use.

Other objects and advantages of the invention will become apparent from the following description and the appended claims taken in conjunction with the accompanying drawings forming part of this specification, and in which:

Figure 1:
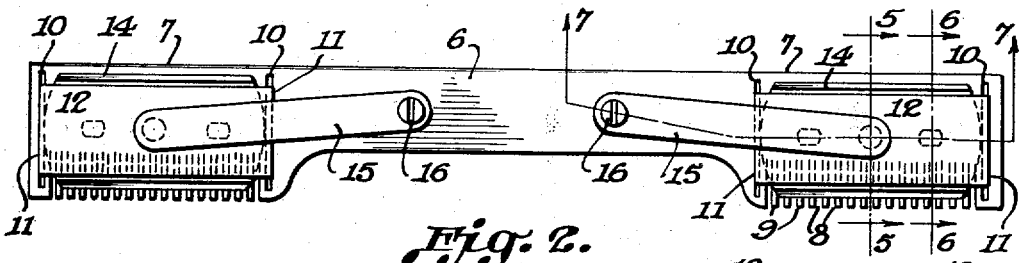
Fig. 1 is a plan view of a device embodying the invention in a preferred form.
Figure 2:
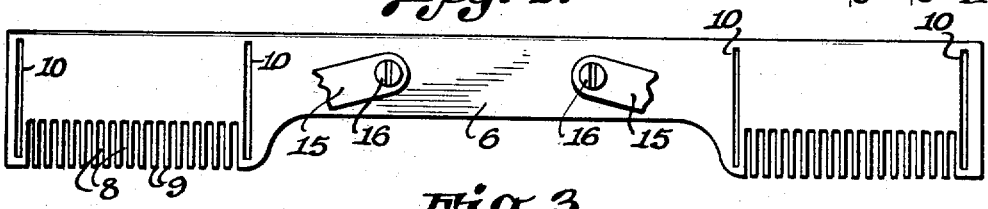
Fig. 2 is a view similar to Fig. 1, but some of the parts broken away to better disclose the invention.
Figure 3:
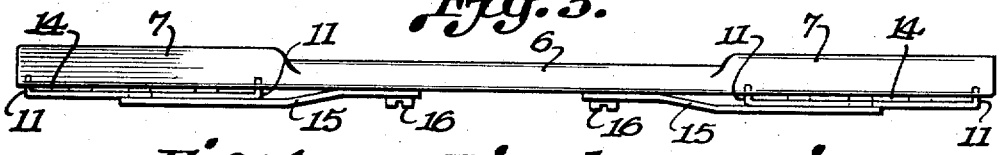
Fig. 3 is an edge or side elevational view.
Figure 4:
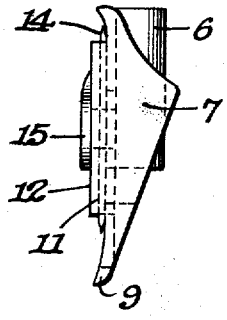
Fig. 4 is an end view.
Figure 5:
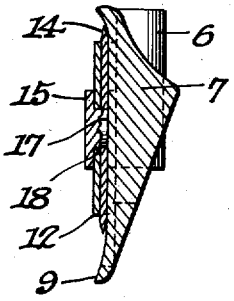
Figure 6:
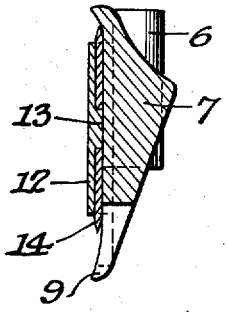
Figure 7:
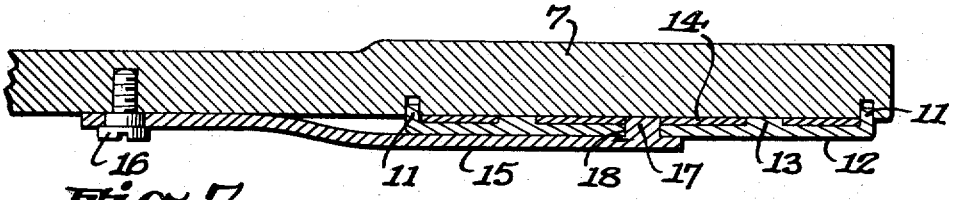
Figure 8:
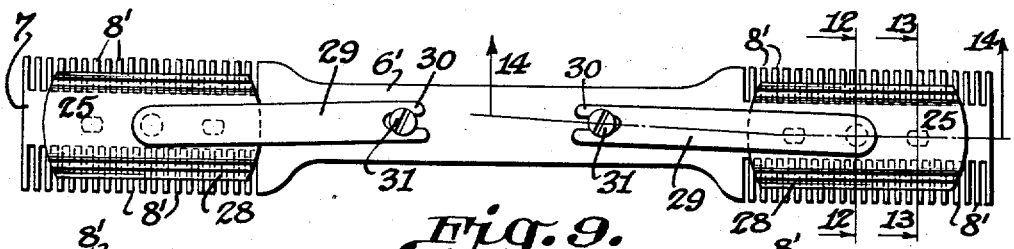
Figure 9:
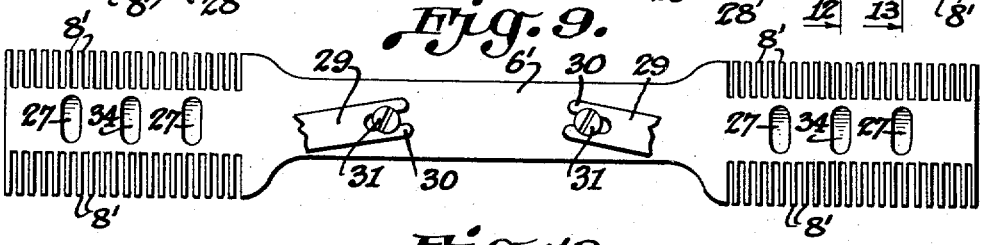
Figure 10:
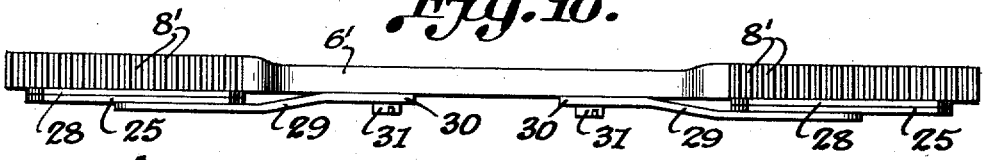
Figure 11:
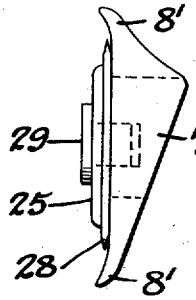
Figure 12:
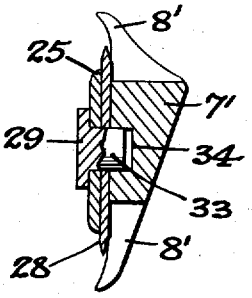
Figure 13:
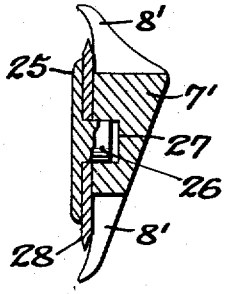
Figure 14:
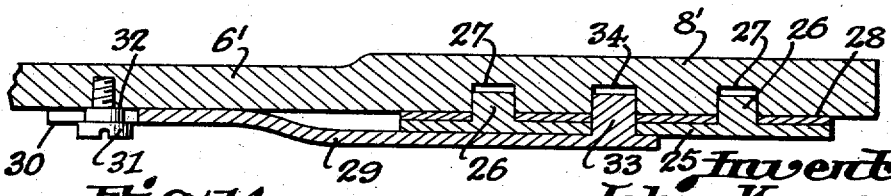

Figs. 5 and 6 are transverse sections on the lines 5—5 and 6—6, respectively, of Fig. 1;

Fig. 7 is an enlarged fragmentary longitudinal section on the line 7—7 of Fig. 1;

Fig. 8 is a view similar to Fig. 1, showing a slightly modified form;

Fig. 9 is a view similar to Fig. 8, some of the parts being broken away to show the construction;

Fig. 10 is an edge view of the device shown in Fig. 8;

Fig. 11 is an end view of the device shown in Fig. 8;

Figs. 12 and 13 are transverse sections on the lines 12—12 and 13—13, respectively, of Fig. 8; and Fig. 14 is an enlarged fragmentary longitudinal section on the line 14—14 of Fig. 8.

Attention is first directed to the form of device shown in Figs. 1 to 7, inclusive.

As shown therein, the device consists of a handle member 6 having an enlarged palm 7 at each end thereof.

The end portions 7 are triangular in transverse cross section, having forward edges $7^a$ which are quite tapered in the manner of thin wedges and rear edges $7^b$ which are more quickly tapered.

The thin edges $7^a$ of the end portions 7 are provided with transversely extending, parallel edge slots 8 arranged to provide a series of comb-like teeth 9.

The two end portions 7 are duplicates of each other except that they are arranged right and left for convenience in use.

The description of one end of the device will suffice for both.

At each end, means are provided for clamping a thin razor blade 14 against the flat side of the palm 7. This means consists of a clamping plate 12 which is provided with short projections 13 which are arranged and adapted to enter the usual guide holes in razors of this kind which are in common use.

For holding the plate yieldingly pressed toward the palm 7 to hold the razor blade firmly clamped in position, a spring member 15 is provided. This member is in the form of a flat spring, one end of which is secured to the handle 6 between the end portions 7 by a screw 16, and its other end, in the form shown, is provided with a projection 17 arranged and adapted to be received in a central opening 18 in the clamping plate and also project into a central opening in a razor blade 14.

For the purpose of retaining the operating edge of the razor blade substantially parallel with the comb teeth 9, the palm 7 is provided with transversely extending guide slots 10 and the ends of the plate 12 are bent to provide parallel guide flanges 11 which fit in the guide slots.

The movement back and forth of the plate and the blade is not very much and there is sufficient freedom in the engagement of the parts to allow this movement without binding.

Preferably, the palm 7 is curved or inclined on its toothed edge to provide a close engagement with the operating edge of the razor blade 14 for the purpose of preventing hairs becoming wedged in between the blade and the teeth 9. The longer plane portion on the back of the palm 7 is adapted to be pressed against the skin or head when the device is being used and the adjustment of the blade from and toward the teeth is for the purpose of regulating the depth of hair left on the head. That is, when the edge of the blade is moved out toward the ends of the teeth 9, the device will cut the hair quite short and when moved back towards the bases of the teeth, it will not cut the hair so short.

In Figs. 8 to 14, inclusive, I have shown a form of the devices which is different in several details than the form so far described.

The modified structure has a handle 6′ quite similar to the handle 6 in that it is double ended and has means for yieldingly clamping a thin flat razor blade on each end.

The flat palms 7′ at each end are likewise triangular shaped in cross-section, similar to the palms 7, each having a long thin tapered edge $77^a$ and a more blunt tapered edge $77^b$.

As shown, each of these edges are slotted in from the edge forming comb-like teeth 8′ and 8″, respectively. The comb-like teeth are formed on each edge of each end to permit the use of the blunter edges $77^b$ in cutting hair as well as the opposite edges. These blunter edges are especially adapted for trimming or cutting the hair around the ears, these places being the most difficult to cut with any unguarded instrument without danger of cutting the skin.

In this form, the blade holding plate 25 is provided with projections 26 which are received in slots 27 formed in the enlarged end 7′ and the clamping plate 25 is adapted to clamp a double edged thin razor blade 28 between the plate and the palm 7′. The projections 26 are adapted to register with the guide openings in a well known make of razor blade and to hold the blade against rotation. The free ends of the projections 26 are adapted to slide back and forth in the slots 27, which may be arcuate in form, as shown, to avoid undue friction.

As in the form first described, a flat clamping spring 29 is provided for yieldingly holding the plate 25 against the palm 7′. This spring is pivotally engaged to the plate 25 by means of a projection 33 which is received in the usual center hole of the blade and its free end projects through the blade into a slot 34 in the palm 7′ similar to the arcuate slots 27. The spring 29 is secured to the handle 6′ at its opposite end by a screw 31, provided with a shoulder 32 slightly thicker than the thickness of the spring, and the spring end is slotted, as shown at 30 to receive the shoulder part of the screw.

This construction allows transverse movement of the clamping plate 25 and razor blade 28 relative to the comb portions 8′ and 8″ to regulate the amount of hair removed.

Either one of the comb portions can be used for cutting hair or the like, as the blade 28 is shiftable from one edge to the opposite edge and the blades can be adjusted relatively to the edges for cutting off more or less hair or leaving more or less hair uncut, as may be desired.

As the two ends of the device are reversed as to each other, that is, as one is right hand and the other left hand, the device is well adapted for trimming the hair on a human head when it is necessary to trim around both the left ear and the right ear.

As many modifications of the invention will readily suggest themselves to one skilled in the art, I do not limit or confine the invention to the specific details of construction or operation herein shown and described.

I claim:

1. In a device of the kind described, a handle member, the handle formed to provide comb teeth at the edge of the member near one end thereof, a plate formed to hold a thin razor blade with a cutting edge substantially parallel with the toothed edge of the handle, yielding clamping means for holding the plate pressed against the handle and adapted to hold a blade between the handle and the plate, the plate arranged and adapted to be moved transversely of the handle for adjusting the cutting edge of a blade from and toward the points of the teeth of the comb, the plate and handle provided with a transversely extending inter-engaging guide rib and groove for retaining the cutting edge of the blade substantially parallel with the points of the comb teeth as the blade is adjusted transversely of the handle.

2. The invention as defined in claim 1, the transverse guide groove being formed in the handle and the guide rib formed on the plate.

3. The invention as defined in claim 1, the handle having comb teeth formed on each edge thereof, and the plate adapted to hold a thin double edged blade, the toothed edged parts of the handle being quite thin at the points of the teeth and increasing in thickness towards the middle of the handle, one edge being more quickly tapered than the other as and for the purpose specified.

4. The invention as defined in claim 1, the plate formed to provide a transversely extending flange at one end thereof and the handle provided with a co-operating guide groove to receive same.

5. The invention as defined in claim 1, the plate formed to provide transversely extending guide flanges at each end thereof, and the handle provided with co-operating guide grooves to receive same.

6. In a device of the kind described, a handle member, having an end portion adapted to receive a thin flat razor blade, said handle portion having comb-like teeth formed on each transverse edge, means for clamping a double edged razor blade upon said end with its edges substantially parallel with the points of the comb-like teeth, means for adjusting the blade transversely of the handle for the purpose described, and said end portion of the handle being substantially triangular in cross-section, one edge being thinner than the other.

7. The invention as defined in claim 6, and a similar construction at the opposite end of the handle, the thinner edges of said end portions being arranged on the same side of the handle.

8. In a device of the kind described, a handle member, having an end portion adapted to receive a thin flat razor blade, said handle portion having comb-like teeth formed on one edge thereof, means for clamping a thin flat razor blade on said end with an edge substantially parallel with the points of the teeth, means for adjusting the cutting edge of the blade from and toward the points of the teeth, the edge portions of said end of the handle being wedge-shaped and the toothed edge thinner than the other edge, and the opposite end of the handle having a similar construction, the teeth at the two ends being formed on the same side of the handle whereby the device can be used either right handed or left handed.

9. A razor blade holder, including a handle portion, comb teeth formed on lateral edges of one end of the handle, a clamping plate adapted to be carried adjacent to the comb teeth portion, projections on the clamping plate adapted to be received in the usual guide opening in a flat double edged razor blade of the kind commonly in use, a spring clip for holding the clamping plate pressed upon the handle between the comb teeth, the clamping plate having a central hole arranged to register with a central hole of such a razor blade held on the projections on the clamping plate, the spring clip having a projection at one end arranged and adapted to project through the center hole in the clamping plate and the central hole in a razor blade held thereby, the opposite end of the spring clip being bifurcated for receiving a clamping screw for securing the clip to the handle, and means for guiding the clamping plate and blade carried thereon as the plate is moved transversely of the handle.

10. The invention as defined in claim 9, a similar construction being arranged at the opposite end of the handle, the two edges at each end of the handle being dissimilar in transverse shape and the edges at each of the two ends on the same side of the handle being similar in transverse section, whereby the device can be used either right or left hand.

In testimony whereof, I have hereunto set my hand this 24th day of July, 1931.

JOHN KEENAN.